(12) United States Patent
Oliveira da Silva et al.

(10) Patent No.: US 9,704,210 B2
(45) Date of Patent: Jul. 11, 2017

(54) NORMALIZED MARK DATA (71) Applicant: HEWLETT-PACKARD DEVELOPMENT COMPANY, L.P., Houston, TX (US)

(72) Inventors: Renato Oliveira da Silva, Porto Alegre (BR); Lucio Cossio, Porto Alegre (BR)

(73) Assignee: Hewlett-Packard Development Company, L.P., Houston, TX (US)

( * ) Notice: Subject to any disclaimer, the term of this patent is extended or adjusted under 35 U.S.C. 154(b) by 59 days.

(21) Appl. No.: 14/954,604

(22) Filed: Nov. 30, 2015

(65) Prior Publication Data

US 2017/0154399 A1    Jun. 1, 2017

(51) Int. Cl.
*G06T 1/00* (2006.01)
*G06K 9/46* (2006.01)
*G06K 9/62* (2006.01)
*H04N 1/32* (2006.01)

(52) U.S. Cl.
CPC .......... *G06T 1/0021* (2013.01); *G06K 9/4604* (2013.01); *G06K 9/4652* (2013.01); *G06K 9/4661* (2013.01); *G06K 9/621* (2013.01); *G06K 9/6215* (2013.01); *H04N 1/32149* (2013.01);
(Continued)

(58) Field of Classification Search
CPC ... G06T 1/0021; G06T 1/0028; G06T 1/0035; G06T 1/0085; G06T 1/0092; G06T 7/0085; G06T 7/408; G06T 2201/005; G06T 2201/0053; G06T 2201/0065; G06K 9/4604; G06K 9/4652; G06K 9/4661; G06K 9/621; G06K 9/6215; H04H 2201/50; H04N 1/32144; H04N 1/32149; H04N 1/32208; H04N 1/32224; H04N 19/467; H04N 2201/3233; H04N 2201/3238; H04L 2209/608
See application file for complete search history.

(56) References Cited

U.S. PATENT DOCUMENTS 6,222,932 B1 * 4/2001 Rao ................. G06T 1/0028
380/54
6,590,996 B1 * 7/2003 Reed ................ G06T 1/0021
235/468
(Continued)

FOREIGN PATENT DOCUMENTS

EP    2302599    3/2011

OTHER PUBLICATIONS

Garcia. Robust Watermarking Techniques for Authentication of printed copies through digital camera captures. Mar. 8, 2013.
(Continued)

*Primary Examiner* — Manav Seth
(74) *Attorney, Agent, or Firm* — HP Inc. Patent Department (57) ABSTRACT

In one example, a system including an isolation engine, a normalization engine, and a channel engine is described. In the example, the isolation engine generates mark data using a mark technique based on a first input color channel and a second input color channel, the normalization engine scales intensity values of a set of pixels of the mark data to a greater range, and the channel engine generates output channel data for a plurality of output color channels from normalized mark data based on the scaled intensity values.

15 Claims, 5 Drawing Sheets

(52) U.S. Cl.
CPC ... *H04N 1/32208* (2013.01); *G06T 2201/005* (2013.01)

(56) References Cited

U.S. PATENT DOCUMENTS

| | | | | |
|---|---|---|---|---|
| 6,804,377 | B2* | 10/2004 | Reed | G06T 1/0028 358/3.28 |
| 6,891,959 | B2* | 5/2005 | Reed | G06F 17/30876 382/100 |
| 7,246,239 | B2 | 7/2007 | Rodriguez et al. | |
| 7,308,110 | B2* | 12/2007 | Rhoads | G06F 17/30876 382/100 |
| 7,391,880 | B2* | 6/2008 | Reed | G06T 1/0021 235/468 |
| 7,693,300 | B2* | 4/2010 | Reed | G06T 1/0021 235/468 |
| 7,937,588 | B2* | 5/2011 | Picard | G06T 1/0042 713/176 |
| 8,027,509 | B2* | 9/2011 | Reed | G06T 1/0028 382/100 |
| 8,050,450 | B2* | 11/2011 | Miller | G06T 1/0092 382/100 |
| 8,155,378 | B2* | 4/2012 | Reed | G06T 1/0021 235/468 |
| 8,199,969 | B2* | 6/2012 | Reed | G06T 1/0021 382/100 |
| 8,660,298 | B2* | 2/2014 | Reed | G06T 1/0021 382/100 |
| 9,067,671 | B2 | 6/2015 | Stark et al. | |
| 9,324,012 | B2* | 4/2016 | Robinson | G06K 15/1882 |
| 2015/0187039 | A1* | 7/2015 | Reed | G06T 1/0028 382/100 |

OTHER PUBLICATIONS

Hiary. Paper-based Watermark Extraction with Image Processing. University of Leeds. Jul. 2008.

* cited by examiner

NORMALIZED MARK DATA

BACKGROUND

Electronic devices generally communicate and/or store information. For example, visual information, such as a digital photo, may be captured by a digital camera. Information may be concealed in a photo using a steganographic technique that conceals information. For example, a watermark may be visually hidden to perception by an average human within a human-perceptible image. Such marks may be perceptible by a machine even if beyond the capabilities of a human.

DETAILED DESCRIPTION

In the following description and figures, some example implementations of apparatus, systems, and/or methods for enhancing detection of a mark are described. Information may be concealed within other information using steganography, such as by embedding a watermark within a digital image. In steganography, the payload represents the covert data that is to be at least partially hidden and the carrier refers to information that is to at least partially hide the payload. A carrier may be a signal, a data stream, or a data file, for example. As used herein, a mark refers to the payload and mark data refers to data that represents pixel values of the payload.

A digital image with an embedded mark may be printed and scanned, such as by a camera or optical sensor. For example, a user may see a picture in a magazine and may use a mobile phone device to scan the picture in the magazine. A machine, such as a capture mechanism, may perform a scan that identifies the concealed information using a mark technique to identify specific pixel attributes related to the mark. For example, often the captured image is sent to a mark detector in its original form, where the mark content is mixed to some extent with the image that is embedding it. Scanning content for a mark becomes increasingly difficult as embedded payload information improves in imperceptibility within the carrier content.

Various examples described below relate to preprocessing intensities of pixel data associated with a mark isolated from a content source and sending the preprocessed mark data to a detector. The mark-to-image ratio, for example, may be improved by normalizing pixel intensities associated with the mark and preparing to send the normalized mark data using a multiple channel output as input to a detector that uses the multiple channels to perform the mark detection. By preprocessing the media content to improve mark isolation prior to sending the data to the detector, the detector may, for example, produce an improved detection (e.g., reliability of detection) of the mark by the operations performed by the detector.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus may be based only on the stimulus or a combination of stimuli including the stimulus.

Figure 1:
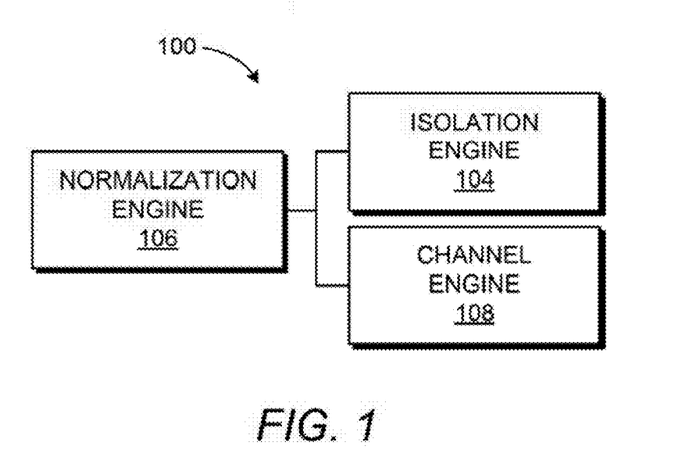
FIGS. 1 and 2 are block diagrams depicting example systems for enhancing detection of a mark.
Figure 2:
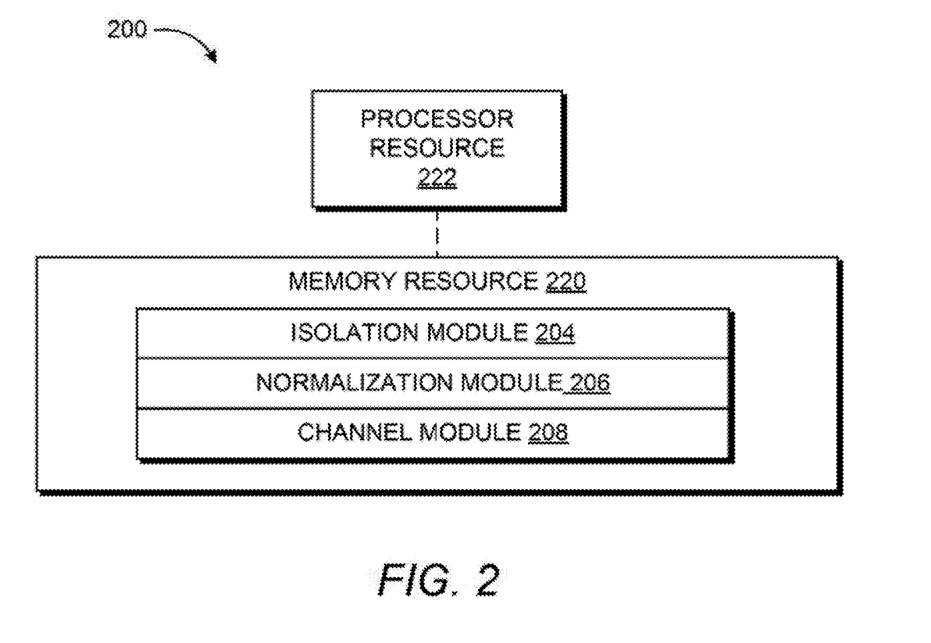

FIGS. 1 and 2 are block diagrams depicting example systems 100 and 200 for enhancing detection of a mark. Referring to FIG. 1, the example system 100 of FIG. 1 generally includes an isolation engine 104, a normalization engine 106, and a channel engine 108. In general, the normalization engine 106 may modify the mark data isolated by the isolation engine 104 and the normalized mark data may be generated as output channel data by the channel engine 108.

The isolation engine 104 represents any circuitry or combination of circuitry and executable instructions to generate mark data using a mark technique based on a first input color channel data from source data and a second input color channel data from the source data. The first input color channel data is associated with a first input color channel that is correlated to a second input color channel associated with the second input color channel data based on a chrominance emphasis associated with the mark technique. In such a mark technique, the combined input color channel may comprise mark data. As used herein, the mark technique may be any steganographic operation(s) that defines and/or uses a relationship between color input channels to identify mark data that represents concealed information. For example, the mark technique may define isolating the mark from the image content from a U chrominance channel and a V chrominance channel which identify the range of colors used by the mark technique. The mark technique may generally utilize channels with a complementary relationship to isolate the pixel data associated with a mark. In a multi-channel example, the first input color channel data is associated with a first input color channel that is correlated to a second input color channel associated with the second input color channel data based on a chrominance emphasis associated with the mark technique, and the combined input color channel may comprise mark data. The isolation engine 104 may separate the channels from the source or receive the source data as data sets already separated into channels. A channel, as used herein, refers to data representing portions of visual information of a color space. Visual information may be visual components of image content or video content where the data may be supplied as stored data, data streams, and/or a signal, which are forms of data encompassed herein when referring to data related to a channel. For example, a channel may be an array of values where three arrays of values represent data for a color component for red green blue (RGB) components of RGB color space. For another example, a channel may refer to an array of luminance values, such as in a YUV color space. A color space, as used herein, is a mapping of a description of colors registerable by a sensor (e.g., a human eye) to physically producible colors. Example color spaces include RGB, YUV, XYZ, cyan magenta yellow black (CMYK), hue saturation value (HSV), lightness with A and B color-opponent dimensions (LAB), and the like.

In one example of a mark technique, the mark is embedded in multiple channels where the channels are encoded in opposing directions. In that example the isolation engine 104 may combine the first input color channel and the second input color channel to produce a combined input color channel that is a subset of the source data (e.g., sum the U chrominance channel and the V chrominance channel to produce a UV channel data set) and may discard other channel data such as a third input channel data from the source data (e.g., discard the Y luminance channel). The isolation engine 104 may produce a single-channel data set derived from combining multiple channels, such as combining a U color channel and a V color channel that are complementary channels with respect to encoding direction to produce a UV color channel. The first input color channel data and the second input color channels may be combined in a variety of ways by the isolation engine 104. Some examples include performing an averaging operation that generates a single channel with pixel values that are the average values of the first and second channel or by performing a sum operation that adds the values of the first and second channels to generate a single channel with pixel values of the added values of the first and second channels.

The normalization engine 106 represents any circuitry or combination of circuitry and executable instructions to modify mark data to increase an intensity range of the pixels of the mark data. For example, the normalization engine 106 may represent a combination of circuitry and executable instructions to determine a first intensity range of a set of pixels of the mark data and scale the intensity values of the set of pixels to occupy a second intensity range that is larger than the first intensity range. By expanding the range used by the mark data, the mark's attributes may be more accurately identified by a detector, for example.

The first intensity range may be the range of data used in the mark data. The normalization engine 106 may determine a highest pixel value of the channel and a lowest pixel value of the channel to identify the range to include at least the values between the lowest pixel value and the highest pixel value in the isolated mark data. For example, the normalization engine 106 may determine a highest intensity and the lowest intensity of a set of pixels of the mark data (e.g., the highest pixel value on UV combined channel and the lowest value on the UV combined channel) and identify an upper bound and a lower bound using the highest intensity and the lowest intensity respectively. The highest and lowest pixels values used by the mark data can then be extended to occupy a larger range by converting pixel intensities from the range used by the mark data to the bounds of the larger range. The second intensity range may be the maximum intensity range allowable for the color scheme (e.g., the lowest allowable pixel value of the color scheme to the highest allowable pixel value of the color scheme). For example, the normalization engine 106 may determine the lower bound of the second intensity range to be a minimum intensity value for a color scheme and the upper bound of the second intensity range to be a maximum intensity value for the color scheme. For example, the larger range may be the maximum allowable range of 0 to 255 in intensity value and the actually used range of the mark data from the source data may have a minimum and maximum of 110 to 140 intensity values. In that example, the ranges from 0 to 109 and 141 to 255 are not initially used by the mark data and the mark data may be converted to occupy the full range (or at least a range larger than 110 to 140). The normalization engine 106 may compute a first difference between an upper bound of a first intensity range and a lower bound of the first intensity range (e.g., 110 to 140 in the previous example) and/or a difference between the upper bound of the second intensity range and the lower bound of the second intensity range (e.g., 0 and 255 in the previous example). The normalization engine 106 may convert a pixel intensity of the set of pixels to a second pixel intensity based on a position of the first pixel intensity in the first intensity range (e.g., the range of 110 to 140 in the previous example) and the difference between the upper bound and the lower bound of the second intensity range (e.g., the range of 0 to 255). The conversion from the used mark data range in the source data to the larger intensity range may be computed by the normalization engine 106 by subtraction of the lower bound of the first intensity range from the first pixel intensity to identify the first result, division of the first result by a difference between the upper bound of the first intensity range and the lower bound of the first intensity range to produce a second result, multiplication of a difference between the upper bound of the second intensity range and the lower bound of the second intensity range by the second result to produce a third result, and addition of the lower bound of the second intensity range to the third result to produce the second pixel intensity. Once the mark data has been isolated and modified to increased contrast range of intensity, other channels may be generated (e.g., created) from the normalized mark data to generate input compatible with the detector.

The channel engine 108 represents any circuitry or combination of circuitry and executable instructions to generate output channel data for a plurality of output color channels from normalized mark data. For example, the channel engine may comprise a combination of circuitry and executable instructions to generate a first output channel data from the scaled intensity values of the normalized mark data, a second output channel data from the scaled intensity values of the normalized mark data, and a third output channel from the scaled intensity values of the normalized mark data. The channel engine 108 may prepare output channel data for each channel used by the detector.

The channel engine 108 may copy the scale intensity values of the set of pixels of the normalized mark data to the plurality of output color channels. For example with use with a detector that uses YUV data, the normalized mark data may generate an intensity value at a pixel, for example an intensity value of 170 and that value may be copied to the U channel, the V channel, and the Y channel (e.g., with an overall pixel mark data being defined across channels as 170, 170, and 170).

The channel engine 108 may comprise circuitry or a combination of circuitry and executable instructions to determine whether the saturation level of the source data indicates that the normalized data is not to be sent to the detector. For example, the channel engine 108 may include a combination of circuitry and executable instructions to identify a saturation level of the captured data, compare the saturation level to a saturation threshold based on the particular chrominance emphasized by the mark technique, and cause the original captured data to be sent to the detector when the saturation level achieves a saturation threshold (e.g., is at, above, or below a saturation level represented by the saturation threshold). High saturation levels may affect the output of the normalization performed by the normalization engine, and, therefore, may not create an increased benefit of detection over the original image source, for example.

In some examples, functionalities described herein in relation to any of FIGS. 4-8 may be provided in combination with functionalities described herein in relation to any of FIGS. 4-8.

FIG. 2 depicts the example system 200 may comprise a memory resource 220 operatively coupled to a processor resource 222. Referring to FIG. 2, the memory resource 220 may contain a set of instructions that are executable by the processor resource 222. The set of instructions are operable to cause the processor resource 222 to perform operations of the system 200 when the set of instructions are executed by the processor resource 222. The set of instructions stored on the memory resource 220 may be represented as an isolation module 204, normalization module 206, and a channel module 208. The isolation module 204, the normalization module 206, the and the channel module 208 represent program instructions that when executed function as the isolation engine 104, the normalization engine 106, and the channel engine 108 of FIG. 1, respectively.

The processor resource 222 may carry out a set of instructions to execute the modules 204, 206, 208 and/or any other appropriate operations among and/or associated with the modules of the system 200. For example, the processor resource 222 may carry out a set of instructions to combine channel data from complementary input chroma channels (complementary with regards to mark data embedded in a captured image based on a mark technique that emphasizes a particular chrominance as a watermark), identify a first set of intensity range of pixels of the combined channel data, normalize a set of intensities of a set of pixels of the combined channel data from the first set of intensity bounds to a second set of intensity bounds (e.g., where the second set of intensity bounds have a greater range than the first set of intensity bounds), place the normalized intensities into normalized mark data that represents the marked data normalized on each channel of a plurality of output channels accepted by a detector, and cause data of the plurality of output channels including the normalized set of intensities in each of the plurality of output channels to be scanned for a watermark using the mark technique implemented by the detector. For another example, the processor resource 222 may carry out a set of instructions to identify an improvement range of pixel values based on the maximum range of intensities of the particular chrominance emphasized that is possible for a format of the captured image, identify a position of a first set of pixel data within the first set of intensity bounds, and identify a corresponding position in the second set of intensity bounds (e.g., where the second set of intensity bounds is and/or includes the improvement range of pixel values) in order to normalize the set of intensities of the set of pixels. For yet another example, the processor resource 222 may carry out a set of instructions to divide a result of subtraction of a lower bound of the first set of intensity bounds from a first intensity of the first set of pixel data by the range of the first set of intensity bounds, add a lower bound of the second set of intensities to a multiplication of the second intensity range by the divided result to produce the corresponding position in the second set of intensity bounds (e.g., the improvement range being the maximum range of intensities of the particular chrominance emphasized by the mark technique), and copy a second set of pixel data within the second set of intensity bounds to each channel of the plurality of output channels (e.g., where the second set of pixel data corresponds to the corresponding position in the second set of intensity bounds) in order to identify the position of the first set of pixel data and convert the position to the second set of pixel data.

Figure 5:
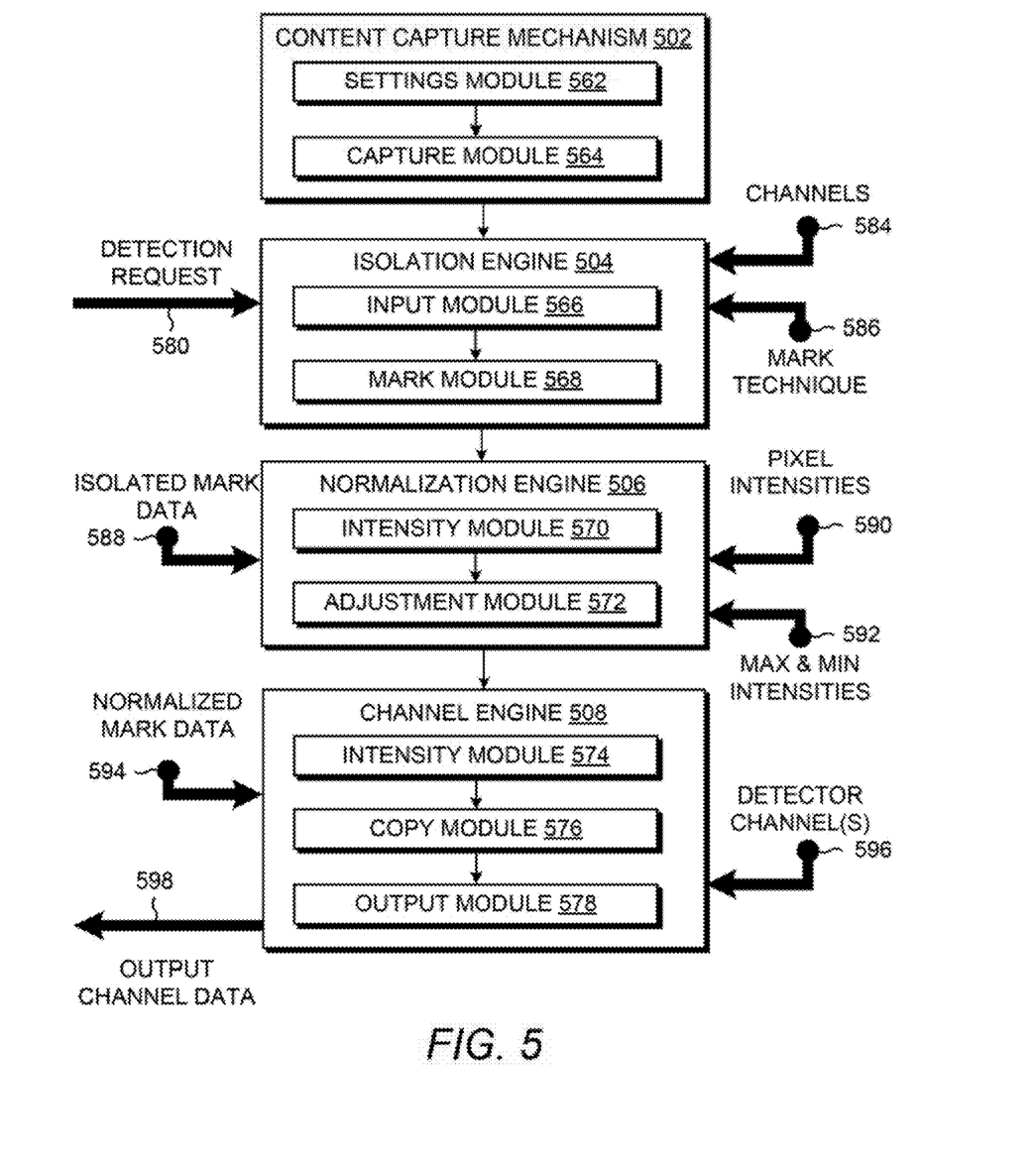

Although these particular modules and various other modules are illustrated and discussed in relation to FIG. 2 and other example implementations, other combinations or sub-combinations of modules may be included within other implementations. Said differently, although the modules illustrated in FIG. 2 and discussed in other example implementations perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules. FIG. 5 depicts yet another example of how functionality may be organized into modules.

The processor resource 222 is any appropriate circuitry capable of processing (e.g., computing) instructions, such as one or multiple processing elements capable of retrieving instructions from the memory resource 220 and executing those instructions. For example, the processor resource 222 may be a central processing unit (CPU) that enables enhanced mark detection by fetching, decoding, and executing modules 204, 206, and 208. Example processor resources include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). The processor resource 222 may include multiple processing elements that are integrated in a single device or distributed across devices. The processor resource 222 may process the instructions serially, concurrently, or in partial concurrence.

The memory resource 220 represents a medium to store data utilized and/or produced by the system 200. The medium is any non-transitory medium or combination of non-transitory media able to electronically store data, such as modules of the system 200 and/or data used by the system 200. For example, the medium may be a storage medium, which is distinct from a transitory transmission medium, such as a signal. As used herein, a non-transitory storage medium refers to any storage medium with the exclusion of a signal. The medium may be machine-readable, such as computer-readable. The medium may be an electronic, magnetic, optical, or other physical storage device that is capable of containing (i.e., storing) executable instructions. The memory resource 220 may be said to store program instructions that when executed by the processor resource 222 cause the processor resource 222 to implement functionality of the system 200 of FIG. 2. The memory resource 220 may be integrated in the same device as the processor resource 222 or it may be separate but accessible to that device and the processor resource 222. The memory resource 220 may be distributed across devices.

In the discussion herein, the engines 104, 106, and 108 of FIG. 1 and the modules 204, 206, and 208 of FIG. 2 have been described as circuitry or a combination of circuitry and executable instructions. Such components may be implemented in a number of fashions. Looking at FIG. 2, the executable instructions may be processor-executable instructions, such as program instructions, stored on the memory resource 220, which is a tangible, non-transitory computer-readable storage medium, and the circuitry may be electronic circuitry, such as processor resource 222, for executing those instructions. The instructions residing on the memory resource 220 may comprise any set of instructions to be executed directly (such as machine code) or indirectly (such as a script) by the processor resource 222.

In some examples, the system 200 may include the executable instructions may be part of an installation package that when installed may be executed by the processor resource 222 to perform operations of the system 200, such as methods described with regards to FIGS. 4-8. In that example, the memory resource 220 may be a portable medium such as a compact disc, a digital video disc, a flash drive, or memory maintained by a computer device, such as a server from which the installation package may be downloaded and installed. In another example, the executable instructions may be part of an application or applications already installed, such as an application installed on a capture device 300 of FIG. 3. The memory resource 220 may be a non-volatile memory resource such as read only memory (ROM), a volatile memory resource such as random access memory (RAM), a storage device, or a combination thereof. Example forms of a memory resource 220 include static RAM (SRAM), dynamic RAM (DRAM), electrically erasable programmable ROM (EEPROM), flash memory, or the like. The memory resource 220 may include integrated memory such as a hard drive (HD), a solid state drive (SSD), or an optical drive.

Figure 3:
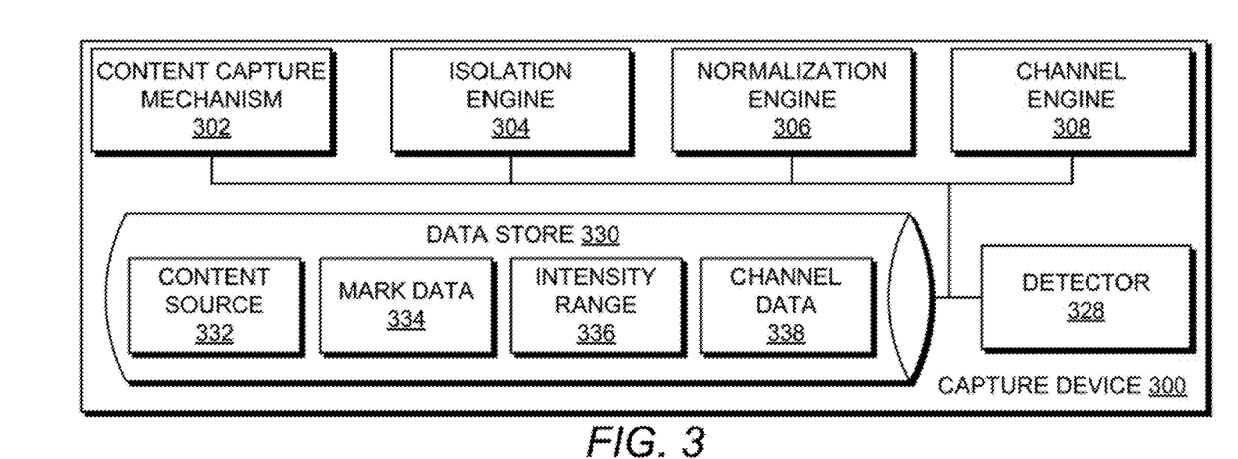
FIG. 3 depicts an example device in which various systems for enhancing detection of a mark may be implemented.

FIG. 3 depicts an example device 300 in which various example systems for enhancing detection of a mark may be implemented. The device 300 comprises a system (described herein with respect to FIGS. 1 and 2) that may represent generally any circuitry or combination of circuitry and executable instructions to enhance detection of a mark. The system 300 may include an isolation engine 304, a normalization engine 306, and a channel engine 308 that are the same as the isolation engine 104, the normalization engine 106, and the channel engine 108 of FIG. 1, respectively, and the associated descriptions are not repeated for brevity. Example capture devices include a digital camera, a mobile telephone, a tablet computer, a security camera, an optical sensor, and the like.

The capture device 300 may further include a content capture mechanism 302, a detector 328, and a data store 330. The content capture mechanism 302 represents any circuitry or combination of circuitry and executable instructions to capture visual content. For example, the content capture mechanism 302 may be a camera lens operated by a controller to capture light using an image sensor and produce digital content (e.g., an image or video) on the data store 330. The data store 330 represents any computer-readable medium as discussed herein. The detector 328 represents a detector used for identifying mark data. A detector, as used herein, represents any circuitry or combination of circuitry and executable instructions that receives an input, identifies the data representing a mark from the input, and identifies information from the identified mark data. For example, a detector may include a barcode scanner that is able to receive an image embedded with a set of vertical lines (e.g., the mark), identifies data in the image representing the set of lines, and identifies a number based on the set of lines. For another example, a detector may include a scanner that is able to receive an image embedded with color variations that are distributed at various locations in the image (e.g., the mark), identifies a pixel pattern associated with the color variations, and identifies information, such as a uniform resource locator (URL), based on the pixel pattern. The input for the detector for examples described herein may be the original content source data 332 and/or the channel data 338 prepared by the normalization engine 306.

The data store 330 may contain information utilized by the engines 304, 306, and 308. For example, the data store 330 may store the content source 332 captured by the content capture mechanism 302, the mark data 334 isolated by the isolation engine 304, an intensity range 336 identified by the normalization engine 306, and the channel data 338 used as output from the channel engine 308 to the detector 328.

As shown in FIG. 3, the components 302, 304, 306, 308, 328, and 330 may be integrated into a compute device, such as a capture device 300. For example, the components 302, 304, 306, 308, 328, and 330 may be integrated via circuitry or as installed instructions into a memory resource of the compute device. Referring to FIGS. 1-3, the engines 104, 106, and 108 of FIG. 1; the modules 204, 206, and 208 of FIG. 2; and/or the components 302, 304, 306, 308, 328, and 330 may be distributed across compute devices. The engine, modules, and/or components may complete or assist completion of operations performed in describing another engine and/or module. For example, the isolation engine 304 of FIG. 3 may request, complete, or perform the methods or operations described with the isolation engine 104 of FIG. 1 as well as the normalization engine 106 and the channel engine 108 of FIG. 1. Thus, although the various engines and modules are shown as separate engines in FIGS. 1 and 2, in other implementations, the functionality of multiple engines and/or modules may be implemented as a single engine and/or module or divided in a variety of engines and/or modules. In some example, the engines of the system 300 may perform example methods described in connection with FIGS. 4-8.

Figure 4:
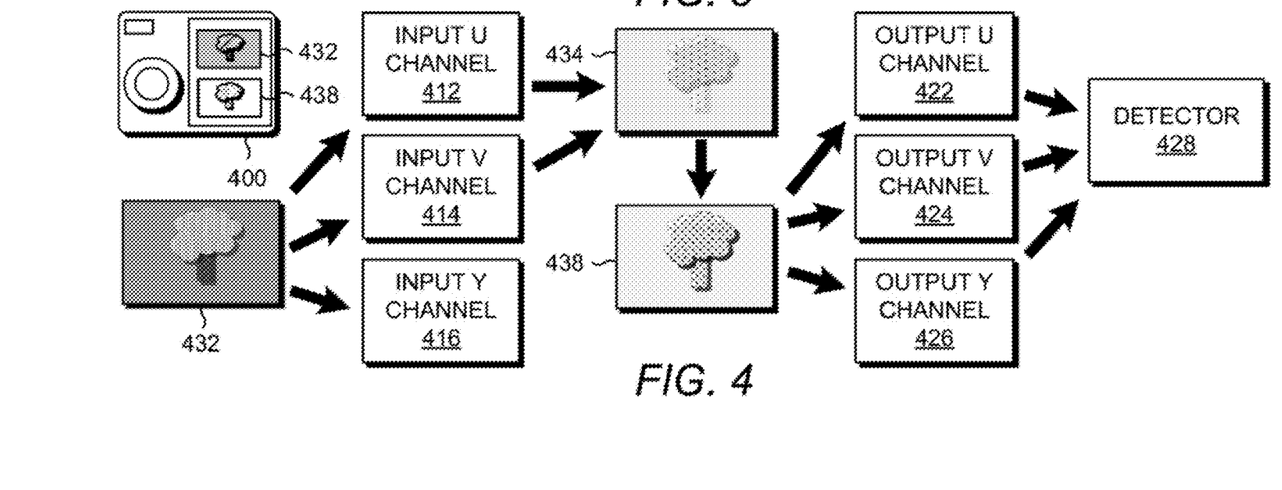
FIGS. 4 and 5 depict example operations used to implement example systems for enhancing detection of a mark.

FIGS. 4 and 5 depict example operations used to implement example systems for enhancing detection of a mark. FIG. 4 depicts an example image capture device 400 that includes the same components as the capture device 300 of FIG. 3. The stages of operations of the image capture device 400 are depicted as blocks and arrows in FIG. 4 and the engines and modules associated with the operations are depicted in FIG. 5. In general, FIG. 4 depicts a captured image 432 being separated into multiple input channels 412, 414, and 416; the channels 412 and 414 are used to isolate mark data 434; the normalized mark data 438 based on modifications to the mark data 434; generating multiple output channels 422, 424, and 426 (e.g., by copying the normalized mark data 434 across multiple output channels 422, 424, and 426); and sending the multiple channels 422, 424, and 426 to the detector 428.

FIG. 5 depicts example components used to implement example operations to enhance detection of a mark. Referring to FIG. 5, the example components of FIG. 5 generally include a content capture mechanism 502, an isolation engine 504, a normalization engine 506, and a channel engine 508 that represent the content capture mechanism 302, the isolation engine 304, the normalization engine 306, and the channel engine 308 of FIG. 3, respectively. The example components of FIG. 5 may be implemented on a compute device, such as capture device 400 of FIG. 4.

A content capture mechanism 502 may include any mechanical components that capture an image, such as using a lens and/or an optical sensor. The content capture mechanism 502 may capture and store images on a capture device, such as capture device 400. The content capture mechanism 502 may also be activated based on a detection request 580 that initiates operations to process an image to send to a detector. The content capture mechanism 502 may include program code, such as a settings modules 562 and a capture module 564, that facilitate capture of content. The settings module 562 represents executable instructions that when executed by a processor resource cause the capture device to set a parameter of the content capture mechanism (e.g., the setting may cause adjustment of the image sensor). The capture module 564 represents executable instructions that when executed by a processor resource cause the capture device to store information from an optical sensor at the settings set via a processor resource executing the settings module 562.

A detection request 580 may cause the isolation engine 504 to isolate mark data in an image captured by the content capture mechanism 502. The isolation engine 504 may include program instructions, such as input module 566 and mark module 568, that facilitate isolating the mark (e.g., data comprising the payload) from the carrier information in the captured image. The input module represents executable instructions that when executed by a processor resource cause the capture device to retrieve source data of the captured content from the channels 584 and identify the complementary channels that produce mark data as defined by the mark technique 586. The mark module 568 represents program instructions that when executed by a processor resource that isolate the mark data by combining the complementary channels and produce a single channel data set based on the combination (e.g., using an averaging operation or a summation operation) defined by the mark technique 586.

The normalization engine 506 receives the isolated mark data 588 identified by the isolation engine 504 and normalizes the isolated mark data 588 to occupy a greater contrast range using the pixel intensities 590 of the isolated mark data 588 in comparison to the maximum and minimum intensities 592. The normalization engine 506 may include program code, such as an intensity module 570 and an adjustment module 572, to facilitate generating normalized values of the isolated mark data. The intensity module 570 represents program instructions that when executed by a processor resource cause the capture device to identify the intensity of a pixel. The adjustment module 572 represents executable instructions that when executed by a processor resource cause the capture device to identify the position of the pixel intensities 590 within the maximum and minimum intensities 592 and scale the pixel intensities into a broader range based on their position in the original range of intensity.

The normalization engine 506 may utilize a series of identification and/or determination operations to convert the mark data to a greater intensity range, some of which have been mentioned herein. An example series of operations to perform the normalization include operations performed by the normalization engine 506 to determine an upper bound of the set of pixels using the maximum intensity of the set of pixels, determine a lower bound of the set of pixels using the minimum intensity of the set of pixels, identify a maximum upper bound using the maximum intensity allowed by the detection system, identify a minimum lower bound using the minimum intensity allowed by the detection system, determine a first difference between the pixel intensity and the lower bound of the set of pixels, determine a second difference between the upper bound of the set of pixels and the lower bound of the set of pixels, determine a first scaled intensity by dividing the first difference by the second difference, determine a third difference between the maximum upper bound and the minimum lower bound, produce a second scaled intensity by multiply the first intensity scale by the third difference, and produce a third scaled intensity by adding the minimum lower bound to the second intensity scale.

The channel engine 508 may receive the normalized mark data 594 and generate output channel data 598 for the detector channel(s) 596 (e.g., for each channel used by the detector as input to identify the mark) based on the normalized mark data 594. The channel engine 508 may include program instructions (such as an intensity module 574, a copy module 576, and an output module 578) to facilitate provision of the normalized mark data to the detector. The intensity module 574 represents executable instructions that when executed by a processor resource cause the capture device to identify the intensity of a pixel (or set of pixels) of the normalized mark data (e.g., the modified UV combination channel). The copy module 576 represents executable instructions that when executed by a processor resource cause the capture device to copy the value (e.g., intensity) of the normalized mark data to a data set for each detector channel 596. The output module 578 represents executable instructions that when executed by a processor resource cause the capture device to send the output channel data 598 to the detector in the form acceptable by the detector and, in this manner, the pixel data for the isolated mark intensities are enhanced, for example, to be more easily detectable via the channels used by the detector.

Figure 6:
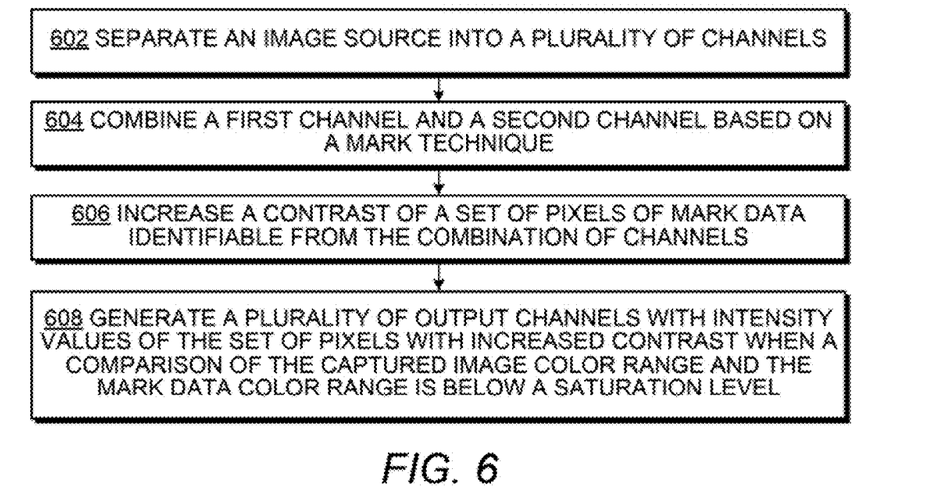
FIGS. 6-8 are flow diagrams depicting example methods for enhancing detection of a mark.
Figure 7:
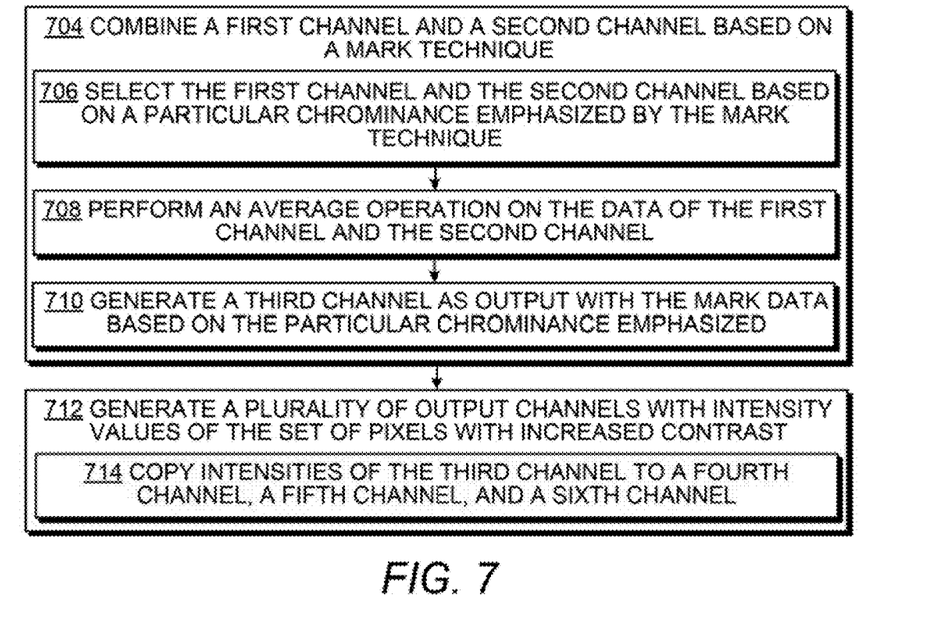
Figure 8:
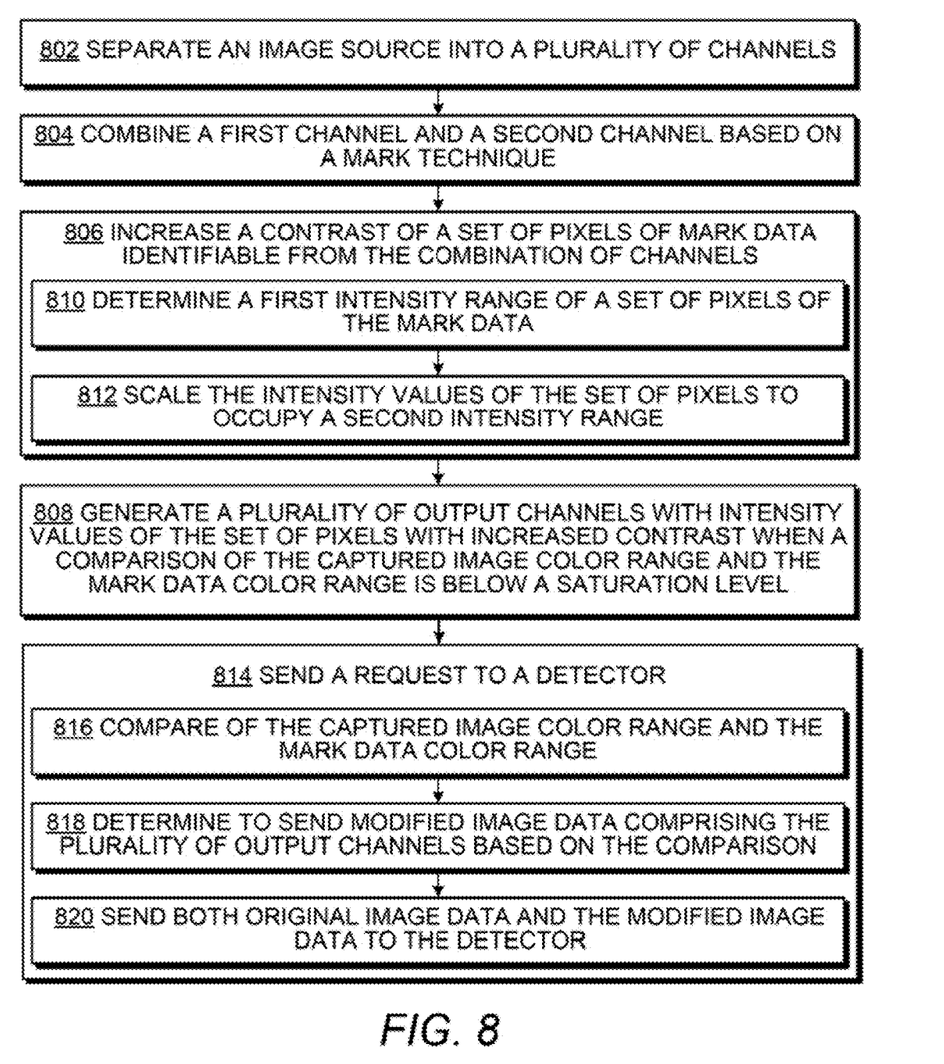

FIGS. 6-8 are flow diagrams depicting example methods for enhancing detection of a mark. Referring to FIG. 6, example methods for enhancing detection of a mark may generally comprise separating an image source into a plurality of input channels, combining a first channel of the plurality of input channels and a second channel of the plurality of input channels based on a mark technique, increasing a contrast of a set of pixels of mark data identifiable from the combination of the first channel and the second channel, and generating a plurality of output channels with intensity values of the set of pixels with increased contrast. The example methods of FIGS. 6-8 are performable by a normalization engine, an isolation engine, and a channel engine, such as the isolation engine 104, the normalization engine 106, and the channel engine 108 of FIG. 1.

At block 602, an image source is separated into a plurality of input channels. For example, an isolation engine, such as the isolation engine 104 of FIG. 1, may separate the content source into a U chrominance channel, a V chrominance channel, and a Y luminance channel. At block 604, a first channel is combined with a second channel based on a mark technique. For example, an isolation engine, such as the isolation engine 104 of FIG. 1, may identify complementary channels to combine as used by the mark technique to identify the mark (such as U and V channels encoded in opposing directions, for example, may be combined) after being identified and separated at block 602. Since used in the decoding manner of the mark technique, the result of the combination is the mark data being isolated, at least partially, from the carrier information. The proper mark decoding technique that corresponds to the encoding technique is to be used when selecting the channels to combine.

At block 606, a contrast of a set of pixels of mark data is increased. For example, a normalization engine, such as the normalization engine 106 of FIG. 1, may increase the value of the pixel in the direction away from the midpoint of the range of intensities on each pixel of the mark data identifiable from the combination of channels at block 604.

At block 608, a plurality of output channels are generated with intensity values of the set of pixels with increased contrast when a saturation threshold is achieved. For example, a channel engine, such as the channel engine 108 of FIG. 1, may copy the intensity values of the set of pixels with increased contrast to each channel used by the detector when a comparison of the captured image color range and the mark data color range is below a saturation level.

Referring to FIG. 7, further details regarding combining a first channel and a second channel based on a mark technique are depicted. Block 704 and block 712 represents details regarding block 604 and 608 of FIG. 6, respectively. At block 706, the first channel and the second channel are selected based on a particular chrominance emphasized by the mark technique. An averaging operation is performed at block 708 on the data of the first channel and the second channel to combine the first and second channel. At block 710, a third channel is generated as output with the mark data based on the particular chrominance emphasized by the mark technique. At block 714, the intensities are copied from the third channel of combined channel data with isolated mark data to a fourth channel, a fifth channel, and a sixth channel to be a plurality of output channels to send to a detector.

FIG. 8 includes blocks similar to blocks of FIG. 6 and FIG. 7 and provides additional blocks and details. In particular, FIG. 8 depicts additional blocks and details generally regarding increasing pixel contrast by scaling the intensities to another range and sending a request to a detector. Blocks 802, 804, 806, and 808 are the same as blocks 602, 604, 606, and 608 of FIG. 6 and, for brevity, their respective descriptions are not repeated in their entirety.

At block 810, a first intensity range of a set of pixels of mark data is determined and the intensity values in the first intensity range are scaled to occupy a second intensity range that is greater than the first intensity range at block 812. The range identification and scaling operations may be performed by a normalization engine, such as the normalization engine 106 of FIG. 1.

At block 814, a request is sent to a detector. For example, the mark data is sent to a detector as a plurality of output channels by a channel engine, such as channel engine 108 of FIG. 1. At block 816, a captured image color range is compared to the mark data color range. For example, a channel engine, such as channel engine 108 of FIG. 1, may determine that the captured image color range saturates the mark data color range based on the comparison of the ranges, and, as a result, may not send the modified image data with the normalized mark data. At block 818, a determination to send modified image data comprising the output channels generated at block 808 to the detector based on the comparison at block 816. Both the original image data and the modified image data is sent to the detector at block 820 when the saturation level achieves a threshold associated with improved accuracy by the detector. For example, a channel engine, such as the channel engine 108 of FIG. 1, may send the original capture data and, when the saturation threshold is achieved, may send the normalized mark data as well. In this manner, assistive data with the mark isolated and normalized may be sent to the detector to increase, for example, reliability and accuracy of the detector.

Although the flow diagrams of FIGS. 4-8 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

All of the features disclosed in this specification (including any accompanying claims, abstract and drawings), and/or all of the elements of any method or process so disclosed, may be combined in any combination, except combinations where at least some of such features and/or elements are mutually exclusive.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

What is claimed is:

1. A system comprising:
    an isolation engine to generate mark data using a mark technique based on a first input color channel data from source data and a second input color channel data from the source data, the first input color channel data of a first input color channel correlated, based on a chrominance emphasis associated with the mark technique, to a second input color channel associated with the second input color channel data;
    a normalization engine to:
        determine a first intensity range of a set of pixels of the mark data;
        scale intensity values of the set of pixels to occupy a second intensity range, the second intensity range greater than the first intensity range; and
    a channel engine to generate output channel data for a plurality of output color channels from normalized mark data based on the scaled intensity values.

2. The system of claim 1, wherein:
    the isolation engine is to:
        discard a third input channel data from the source data; and
        combine the first input color channel data and the second input color channel to produce a combined input color channel, the combined input color channel to comprise the mark data; and
    the channel engine is to generate:
        a first output channel data of a first output channel of the plurality of output color channels from the scaled intensity values of the mark data;
        a second output channel data of a second output channel of the plurality of output color channels from the scaled intensity values of the mark data; and
        a third output channel data of a third output channel of the plurality of output color channels from the scaled intensity values of the mark data.

3. The system of claim 2, wherein:
    the first input color channel is a U chrominance channel;
    the second input color channel is a V chrominance channel;
    the isolation engine combines the first input color channel data and the second input color channel using one of an averaging operation or a sum operation; and
    the channel engine is to copy the scale intensity values of the set of pixels to the plurality of output color channels, the plurality of output color channels including the U chrominance channel, the V chrominance channel, and a Y luminance channel.

4. The system of claim 1, wherein the normalization engine is to:
    determine a highest intensity of the set of pixels;
    determine a lowest intensity of the set of pixels;
    identify an upper bound of the first intensity range using the highest intensity;
    identify a lower bound of the first intensity range using the lowest intensity;

compute a first difference between the upper bound of the first intensity range and the lower bound of the first intensity range;

compute a second difference between an upper bound of the second intensity range and a lower bound of the second intensity range; and convert a first pixel intensity of the set of pixels to a second pixel intensity based on a position of the first pixel intensity in the first intensity range and the computed second difference between the upper bound and the lower bound of the second intensity range.

5. The system of claim 4, wherein the normalization engine is to:

subtract the lower bound of the first intensity range from the first pixel intensity to identify the first result;

divide the first result by the first difference to produce a second result;

multiply the second difference by the second result to produce a third result; and add the lower bound of the second intensity range to the third result to produce the second pixel intensity, wherein the lower bound of the second intensity range is a minimum intensity value for a color scheme and the upper bound of the second intensity range is a maximum intensity value for the color scheme.

6. A non-transitory computer-readable storage medium comprising a set of instructions executable by a processor resource to:

combine channel data from complementary input chroma channels, the input chroma channels being complementary with regards to mark data embedded in a captured image based on a mark technique that emphasizes a particular chrominance as a watermark;

identify a first set of intensity bounds of an intensity range of pixels of the combined channel data;

normalize a set of intensities of a set of pixels of the combined channel data from the first set of intensity bounds to a second set of intensity bounds having a greater range than the first set of intensity bounds;

place the normalized set of intensities into normalized mark data that represents the mark data normalized on each channel of a plurality of output channels accepted by a detector; and cause data of the plurality of output channels including the normalized set of intensities in each of the plurality of output channels to be scanned for the watermark using the mark technique.

7. The medium of claim 6, wherein the set of instructions to normalize the set of intensities of the set of pixels is executable by the processor resource to:

identify an improvement range of pixel values based on the maximum range of intensities of the particular chrominance that is possible for a format of the captured image;

identify a position of a first set of pixel data within the first set of intensity bounds; and identify a corresponding position in the second set of intensity bounds, wherein the second set of intensity bounds includes the improvement range of pixel values.

8. The medium of claim 7, wherein:

the improvement range is the maximum range of intensities of the particular chrominance;

the set of instructions to identify the position of the first set of pixel data is executable by the processor resource to:

divide a result of subtraction of a lower bound of the first set of intensity bounds from a first intensity of the first set of pixel data by the range of the first set of intensity bounds;

add a lower bound of the second set of intensities to a multiplication of the second intensity range by the divided result to produce the corresponding position in the second set of intensity bounds; and the set of instruction to place the normalized set of intensities is executable by the processor resource to:

copy a second set of pixel data within the second set of intensity bounds to the each channel of the plurality of output channels, the second set of pixel data corresponding to the corresponding position in the second set of intensity bounds.

9. The medium of claim 6, wherein the set of instructions is executable by the processor resource to:

identify a saturation level of the captured data; and cause original captured data to be sent to the detector when the saturation level achieves a saturation threshold.

10. The medium of claim 9, wherein the set of instructions is executable by the processor resource to:

compare the saturation level to the saturation threshold based on the particular chrominance emphasized by the mark technique.

11. A method for enhancing detection of a mark comprising:

separating an image source into a plurality of input channels;

combining a first channel of the plurality of input channels and a second channel of the plurality of input channels based on a mark technique, the first channel and the second channel complementary to identify mark information based on the mark technique;

increasing a contrast of a set of pixels of mark data identifiable from the combination of the first channel and the second channel; and generating a plurality of output channels with intensity values of the set of pixels with increased contrast when a comparison of the captured image color range and the mark data color range is below a saturation level.

12. The method of claim 11, wherein the increasing the contrast of the set of pixels comprises:

determining a first intensity range of a set of pixels of the mark data; and scaling intensity values of the set of pixels to occupy a second intensity range, the second intensity range greater than the first intensity range.

13. The method of claim 12, wherein:

the combining the first channel and the second channel comprises:

selecting the first channel and the second channel based on a particular chrominance emphasized by the mark technique;

averaging the first channel and the second channel; and generating a third channel as output with the mark data based on the particular chrominance emphasized by the mark technique, wherein the mark technique is useable to embed the watermark in original data based on the emphasized chrominance; and the generating the plurality of output channels with intensity values comprises:

copying intensities of the third channel to a fourth channel, a fifth channel, and a sixth channel, wherein the fourth channel, the fifth channel, and the sixth channel are of the plurality of output channels to send to a detector.

14. The method of claim 12, comprising:

determining to send modified image data of the image source to a detector when the comparison of the captured image color range and the mark data color range satisfies a saturation level, the modified image data comprising the plurality of output channels.

15. The method of claim 14, comprising:

sending both original image data and the modified image data to the detector, the modified image data generated based on a copied set of pixels with increased contrast from the mark data that resulted from combining the first channel and second channel.

* * * * *